Sept. 19, 1933.  A. C. KENNEDY  1,927,288
DIRIGIBLE HEADLIGHT
Original Filed May 3, 1930   2 Sheets-Sheet 1

INVENTOR
Archibald Campbell Kennedy
his Attorney

Sept. 19, 1933.         A. C. KENNEDY           1,927,288
                      DIRIGIBLE HEADLIGHT
               Original Filed May 3, 1930    2 Sheets-Sheet 2
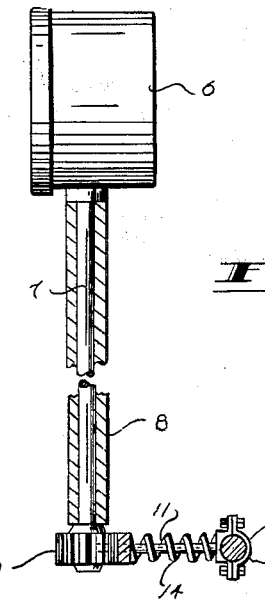
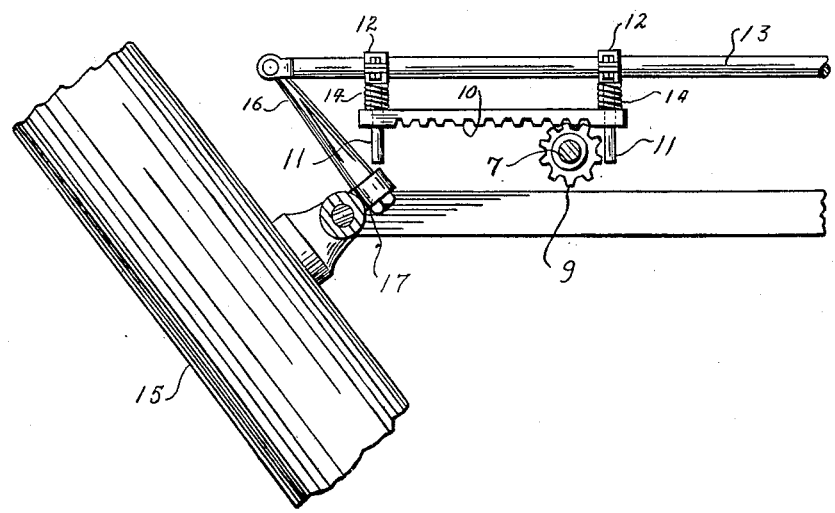
INVENTOR
Archibald Campbell Kennedy
his Attorney Patented Sept. 19, 1933

1,927,288

UNITED STATES PATENT OFFICE 1,927,288

DIRIGIBLE HEADLIGHT

Archibald Campbell Kennedy, Nanaimo, British Columbia, Canada

Application May 3, 1930, Serial No. 449,473
Renewed February 17, 1933

1 Claim. (Cl. 240—62.71)

This present invention relates to certain new and useful improvements in dirigible headlights.

The primary object of the invention resides in the provision of dirigible headlights which will be positively controlled by the steering mechanism for the front wheels.

The invention has for another object the provision of dirigible headlights of the character stated which are operated from the steering mechanism of a motor vehicle so that the headlights will be turned together in the direction of turning of the motor vehicle.

A further object of the invention resides in the provision of dirigible headlights of the character stated which are specially designed for motor vehicles but which may be also applied to locomotives for operation with the front truck wheels thereof.

A still further object of the invention resides in the provision of dirigible headlights of the character stated which may be manufactured at small cost and incorporated in the motor vehicle or locomotive structure at the minimum expenditure of time, labor and expense, thus providing a commercially attractive proposition.

To the accomplishment of these and related objects, as will become apparent as the description proceeds, my invention resides in the construction, combination and arrangement of the parts as shall be hereinafter more fully described, illustrated in the accompanying drawings and pointed out in the claim hereunto appended.

The invention will be best understood and can be more clearly described when reference is had to the drawings forming a part of this disclosure, wherein like characters indicate like parts throughout the several views.

In the drawings:—

Figure 1 a front elevation of a motor vehicle with the dirigible headlights incorporated in the structure thereof;

Figure 3 is a vertical section, taken substantially on the plane of line 3—3 of Figure 1, looking in the direction indicated by the arrows; and Figure 4 is a fragmentary section, similar to Figure 2, with parts broken away and showing one of the steering wheels turned and the dirigible headlight mechanism accordingly operated.

Figure 1:
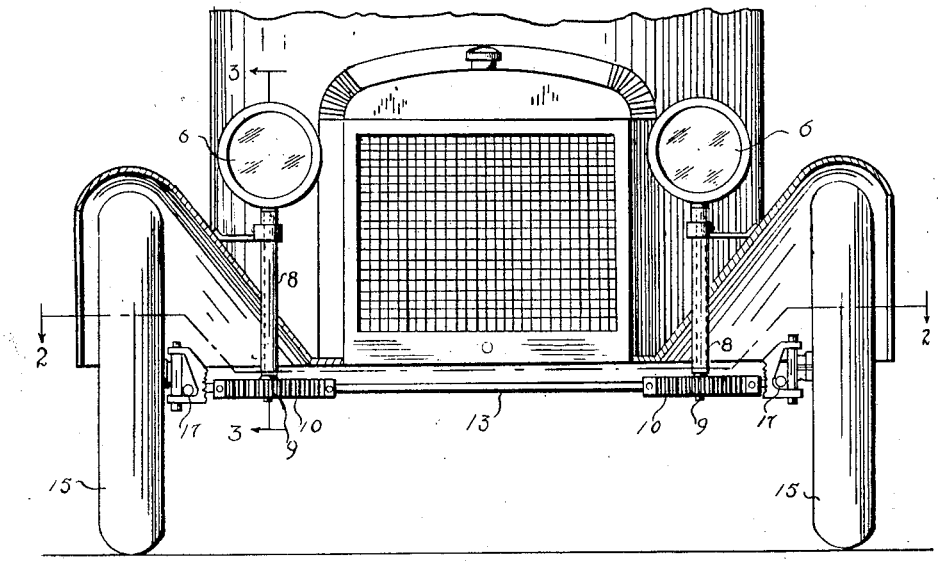
Figure 2:
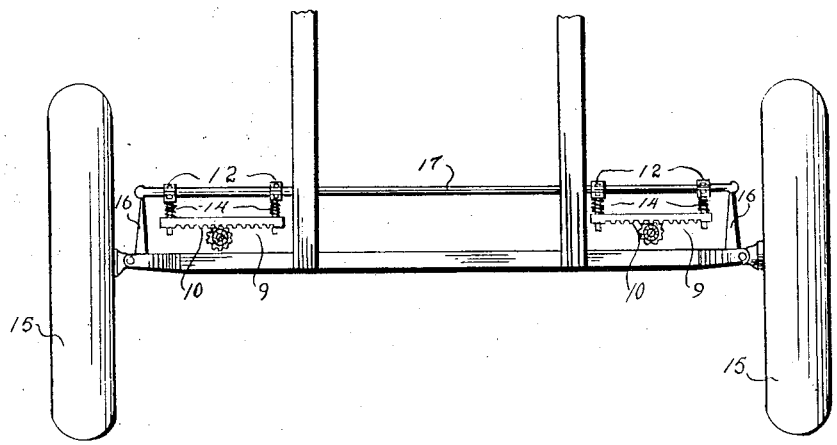
Figure 2 is a horizontal section, taken substantially on the plane of line 2—2 of Figure 1, looking in the direction indicated by the arrows.

Referring more in detail to the drawings, it will be noted that each headlight includes a lamp 6 mounted on the upper end of a vertical standard 7 rotating in the supporting sleeve 8 provided therefor, a gear wheel 9 or pinion being carried on the lower extremity of the standard 7, below the sleeve 8. Meshing with and operating each gear or pinion 9 is the elongated rack 10 mounted by its opposite ends on forwardly extending horizontal pins 11. These pairs of pins 11 are firmly mounted by sectional clamping brackets 12 on the steering bar 13 of the motor vehicle steering mechanism, near one end of the said steering bar 13. Each rack 10 is resiliently retained in operative engagement with the gear or pinion 9 which it operates, by expansion springs 14 positioned on the pins 11, between the rear face of the rack 10 and the clamping brackets 12. It is therefore apparent that as the forward or steering wheels 15 turn to one side through operation of the steering bar 13 and the arms 16 connecting the ends of the steering bar 13 with the steering knuckles 17 for the steering wheels 15, each rack 10 will be moved in a direction corresponding to the direction of movement of the steering bar 13, remaining always parallel thereto. During this operation, the springs 14 are compressed and serve to firmly retain the racks 10 in engagement with their respective gears or pinions 9. The stem 7 and headlight lamps 6 carried thereon are thus positively rotated or turned in a direction corresponding to the direction of turning of the steering wheels 15. As the steering mechanism is returned to normal position with the steering wheels 15 again set for carrying the vehicle in a straight forward direction, the racks 10 will also return to their normal positions and move outwardly on their supporting pins 11, thus relieving the springs 14 of a considerable amount of the compression strain to which they had been subjected.

This same principle and structure may be readily incorporated in the conventional form of motor truck, locomotive and the like by providing a bar similar to the steering bar 13 and connected in a corresponding manner with the forward steering truck or other structure and mounting thereon one or more rack bars arranged as above described for turning the vertical supporting stem or stems of one or more headlights carried on the truck, locomotive or the like.

As the construction of the device has thus been described in detail, brief reference is now had to its use and modus operandi: The steering mechanism is operated in the usual manner with full assurance that the dirigible headlights will be correspondingly operated and also returned automatically to their normal positions as the steering mechanism is returned to its normal position. Owing to the separate racks 10 for operating the gears or pinions 9 on the separate headlight lamp supporting stems 7 being always firmly engaged with said gears or pinions 9, free movement or rattling of the stems 7 and headlight light lamps 6 due to vibration of the parts of the motor vehicle when travelling will be eliminated.

From the foregoing description taken in connection with the accompanying drawings, it will be manifest that dirigible headlights are provided that will fulfill all the necessary requirements of such a device, but as many changes could be made in the above description and many apparently widely different embodiments of my invention may be constructed within the scope of the appended claim without departing from the spirit or scope thereof, it is intended that all matters contained in the said accompanying specification and drawings shall be interpreted as illustrative and not in a limited sense.

Having thus described my invention, what I claim as new and desire to secure by Letters Patent is:—

Dirigible headlights including the combination with a rotatable mounting stem for each headlight and a pinion on each stem; of a steering bar mounted rearwardly of and parallel with a front vehicle axle; pairs of forwardly directed pins clamped upon said steering bar; a rack slidable on each pair of pins and engaged with one of said pinions; spring encircling said pins and pressing upon the ends of said racks to resiliently maintain them in engagement with the respective pinions; and link connections between the ends of said steering bar and the steering knuckles for the wheels of the vehicle.

ARCHIBALD CAMPBELL KENNEDY. [L. S.]